(12) United States Patent
He et al.

(10) Patent No.: US 9,720,166 B2
(45) Date of Patent: Aug. 1, 2017

(54) BACKLIGHT MODULE AND LIQUID CRYSTAL DISPLAY DEVICE

(71) Applicant: Shenzhen China Star Optoelectronics Technology Co., Ltd., Shenzhen, Guangdong (CN)

(72) Inventors: Hu He, Guangdong (CN); Yongyuan Qiu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 315 days.

(21) Appl. No.: 14/394,733

(22) PCT Filed: Sep. 16, 2014

(86) PCT No.: PCT/CN2014/086631
§ 371 (c)(1),
(2) Date: Oct. 15, 2014

(87) PCT Pub. No.: WO2016/037374
PCT Pub. Date: Mar. 17, 2016

(65) Prior Publication Data
US 2016/0070056 A1  Mar. 10, 2016

(30) Foreign Application Priority Data
Sep. 9, 2014 (CN) .......................... 2014 1 0456510

(51) Int. Cl.
*G02F 1/1335* (2006.01)
*F21V 8/00* (2006.01)
(52) U.S. Cl.
CPC ......... *G02B 6/0091* (2013.01); *G02B 6/0023* (2013.01)

(58) Field of Classification Search
None
See application file for complete search history.

(56) References Cited

U.S. PATENT DOCUMENTS

| | | | |
|---|---|---|---|
| 2013/0135893 A1* | 5/2013 | Zhang | G09F 9/35 362/602 |
| 2014/0118911 A1* | 5/2014 | Tang | G02F 1/133308 361/679.01 |

FOREIGN PATENT DOCUMENTS

| | | |
|---|---|---|
| CN | 203442699 U | 2/2014 |
| CN | 103885227 A | 6/2014 |
| JP | 2011222665 A | 11/2011 |

OTHER PUBLICATIONS

Office Action, China Patent Office.

\* cited by examiner

*Primary Examiner* — Richard Kim
(74) *Attorney, Agent, or Firm* — Andrew C. Cheng

(57) ABSTRACT

A backlight module comprises a back plate; a side-type light source; a light guide plate disposed on the back plate; and a quantum bar assembled between the light guide and the light source via a fixing bracket. The fixing bracket is a hollow cylinder, and comprises an accommodating space defined in the fixing bracket for installing the quantum bar and the first window faced toward the light guide plate and the second window faced toward the side-type light source and the length of the second window is equal to one of the light strip. A support beam is disposed on the light strip and between the two light sources, and the length of the support beam is less than or same as a width of the second window, and a height of the support beam is not less than a height of the light source, and the light strip is assembled in the second window.

14 Claims, 4 Drawing Sheets

BACKLIGHT MODULE AND LIQUID CRYSTAL DISPLAY DEVICE

FIELD OF THE INVENTION

The present invention relates to the liquid crystal display device; in particular, to a backlight module and a liquid crystal display device comprising the backlight module.

BACKGROUND OF THE INVENTION

The liquid crystal display (LCD) which has some advantages of thin body, low power consumption, no radiation and many other advantages is widely applicable, for example, mobile, digital camera, TV screen and so on. The liquid crystal displays in the market nowadays belong to the backlight type liquid crystal displays which comprise liquid crystal display panels and backlight modules. The liquid crystal display panel is disposed in opposite to the backlight module. The backlight module provides the light source for the liquid crystal display for showing the images on the liquid crystal display panels. With the society development, the user requirement of the image quality of the LCD is more and more. In order to enhance the color saturation of the screen, the chroma of the light strip in the backlight module should be improved. In the conventional technology, a quantum bar is added to assemble in the backlight module.

The Quantum dot technology is that the semiconductor nano material structure technology which the electrodes are bond in certain range. The Quantum dot technology is formed by the super small compound crystals in the range of 1-100 nm and is applied in lighting and display with the characteristic which changes the wavelength of the incident light. It can use different size to control the wave length. And if the crystal size is accurately controlled, the color also can be controlled. In the LCD technology field, the quantum dot technology has been wisely applied and it adopts the transparent glass packaging generally.

FIG. 1 illustrates the longitudinal sectional view of the quantum bar in the conventional art. FIG. 2 illustrates the cross sectional view of the quantum bar in the conventional art. Refer to FIG. 1. The quantum bar 10 usually comprises a functional part 13 positioned inside and package part 14 wrapped in the functional part 13. The functional part 13 usually is made of material of the quantum dot. The package part is usually made of glass material.

In the backlight module of the liquid crystal display, the quantum bar usually is disposed between the backlight source and the light guide plate via the fixing bracket. As shown in FIG. 3, the backlight module in the conventional art, the backlight module comprises at least one back plate 20, one side type light source 30, one light guide plate 40 and one quantum bar 10, whereby the side-type light source 30 and the light guide plate 40 are disposed on the back plate 20. The light guide plate 40 has an incident plane 40a and an emitting plane 40b, and the incident plane 40a faces toward the side-type light source 30. The quantum bar 10 is disposed between the light guide 40 and the side-type light source 30 via the fixing bracket 50. As shown in FIG. 4, the side-type light source 30 comprises a light strip 30a, which comprises a print circuit board 301 and a plurality of light sources 302 assembled on the print circuit board 301. Correspondingly, the fixing bracket 50 faces to one side of the side-type light source 30. (FIG. 4 only illustrates that one side of which the fixing bracket 50 faces to the side-type light source 30, but omits other part of the fixing bracket 50) Each of the light sources 302 has a light emitting hole 50a and a rib is set between the neighboring hole 50a to ensure that the fixing bracket 50 have enough strength and the light source 302 is not close to the quantum dot.

In view of the conventional fixing bracket, when the size of the liquid crystal display device needs to use different light strips (i.e. when the distance between the light strips changes), the distance between the light emitting holes on the fixing bracket needs to be redesigned to make it be in opposite to the light source in the light strip. The conventional art has higher cost with lack of versatility.

SUMMARY OF THE INVENTION

In view of this, the present invention comprises a backlight module, which comprises:

a back plate;

a side-type light source, comprising a light strip, the light strip comprises a printed circuit board and a plurality of light sources assembled on the printed circuit board;

a light guide plate, disposed on the back light and the light guide plate has an incident plane and an emitting plane, and the incident plane faces toward the side-type light source;

a quantum bar, disposed between the light guide plate and the side-type light source via a fixing bracket;

wherein the fixing bracket is a hollow cylinder, and comprises an accommodating space defined in the fixing bracket for installing the quantum bar; a first window faced toward the light guide plate; and a second window faced toward the side-type light source, and a length of the second window is equal to the length of the light strip;

wherein a support beam is disposed on the light strip and between the two light sources, and a length of the support beam is less than or same as a width of the second window, and a height of the support beam is not less than a height of the light source, and the light strip is assembled in the second window.

Further, the height of the support beam is equal to the height of the light source Further, an area of the first window is larger than an area of the second window.

Further, the first window is from a first end to a second end of the fixing bracket, and the second window has frames respectively on the first end and the second end of the fixing bracket.

Further, the fixing bracket has a clamping hook structure on upper portion of the fixing bracket and a thread connection structure on bottom portion of the fixing bracket, and the fixing bracket connects with the back plate via the clamping hook structure and the thread connection structure.

Further, the material of the support beam is metal or plastic.

Further, the backlight module comprising:

a reflection plate, disposed between the back plate and the light guide plate;

a medium frame, disposed on the fixing bracket;

an optical film set, disposed on the emitting plane of the light guide plate, and part of the optical film set is placed on the medium frame.

Further, material of the fixing bracket is aluminum.

Further, the light source is LED.

A liquid crystal display device is provided. It comprises a liquid crystal display panel and a backlight module, and the liquid crystal display panel is disposed in opposite to the backlight module, and the backlight module provides light sources for the liquid crystal display panel to show images on the liquid crystal display panel, whereby the backlight module is the above mentioned backlight module.

The advantages are that the fixing bracket and the strip of the quantum bar are modified in the backlight module and the emitting light window is disposed on the fixing bracket and the length of the window is same as the light strip. In order to enable to the fixing bracket to be strong enough, the support beam is disposed between the light sources on the light strip and the height of the support beam is not less than the height of the light source. When the light strip is assembled in the emitting light window, the support beam block off the light source and the quantum bar such that the light source does not press close to the quantum bar. Therefore, when the distance of the light source on the light strip is changed, the design of the fixing bracket does not need to be modified and the light strips could all assemble in the emitting light window. Because of the support beam disposed on the light strip, the collapse issue will not happen in the middle part of the fixing bracket. Based on the modification of the structure, in the backlight module, the versatility of the fixing bracket of the quantum bar is high, and it can contain different kind of the light strip structure, and also reduce the cost. Otherwise, the structure of the fixing bracket of the quantum is simpler for the assembly of the light strip and the damage probability of the quantum bar during installation is reduced.

DETAILED DESCRIPTION OF THE PREFERRED EMBODIMENTS

In order to elaborate the technical characteristics and the structure of the present invention well, the following examples combining with the accompanying drawings in detail.

Figure 1:
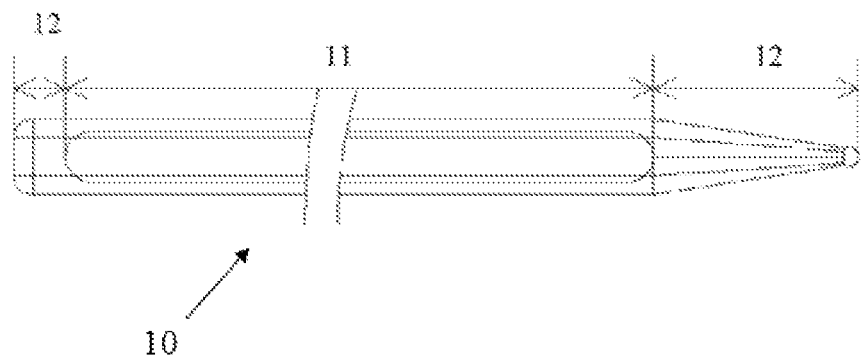
FIG. 1 is the longitudinal sectional view of the quantum bar in the conventional art
Figure 2:
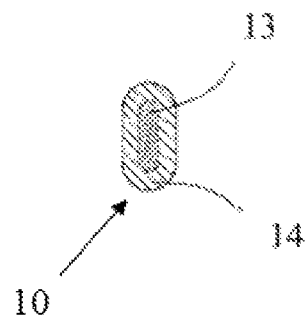
FIG. 2 is the cross sectional view of the quantum bar in the conventional art.
Figure 3:
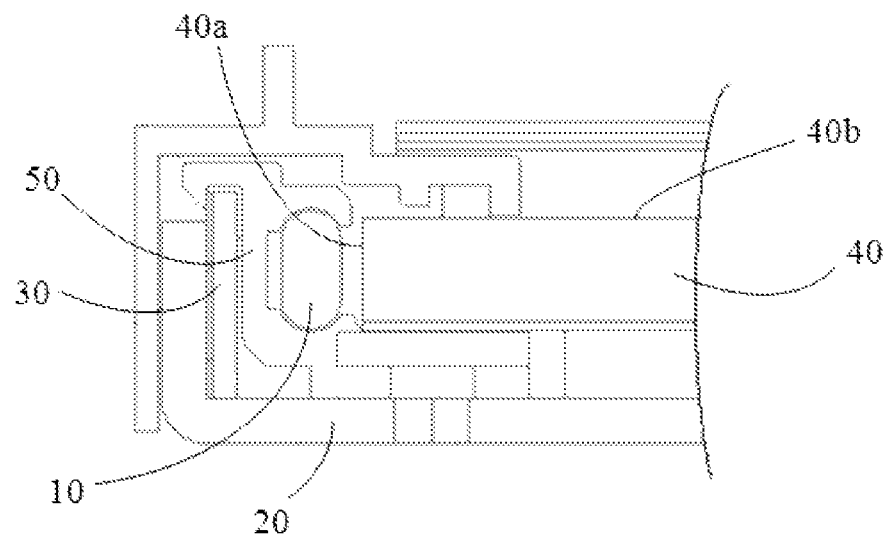
FIG. 3 is the schematic diagram of the fixing bracket of the quantum of the backlight module in the conventional art.
Figure 4:
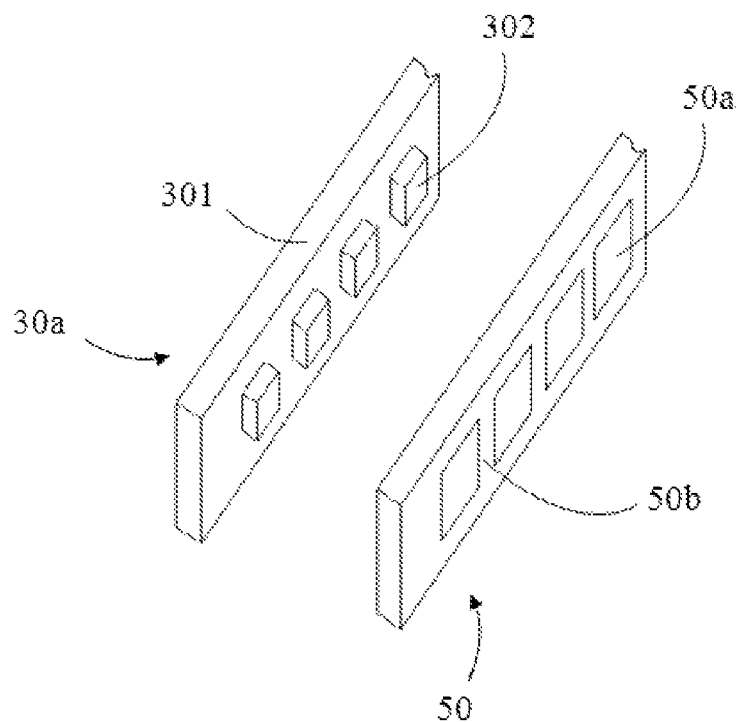
FIG. 4 is the perspective view of the fixing bracket of the quantum bar after assembling the light strip in the conventional art.
Figure 5:
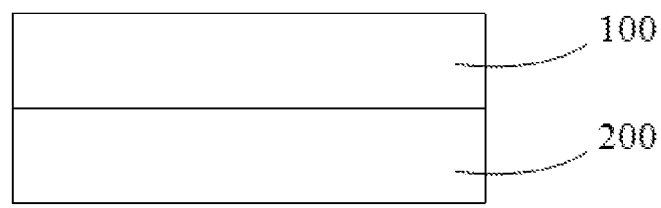
FIG. 5 is the schematic diagram of the liquid crystal display device according to the present invention.

FIG. 5 is the schematic diagram of the liquid crystal display device of the embodiment. As shown in FIG. 5, the liquid crystal display device comprises a liquid crystal display panel 100 and a backlight module 200 and the liquid crystal display panel 100 is placed in opposite to the backlight module 200. The backlight module provides the light source for the liquid crystal display panel 100 for showing the images on the liquid crystal display panel 100.

Please refer to FIG. 6-9. The backlight module 200 comprises at least a back plate 20, a side-type light source 30, a light guide plate 40 and a quantum bar 10, where the side-type light source 30 comprises a light strip 30a and the light strip 30a comprises the print circuit board 301 and a plurality of the light source 302 (the light source 302 could be LED) disposed on the print circuit board 301. The light guide plate 40 has an incident plane 40a and an emitting plane 40b, and the incident plane 40a faces toward the side-type light source 30. The quantum bar 10 is disposed between the light guide plate 40 and the side-type light source via the fixing bracket 50. The backlight module 200 has the reflection plate 60, the medium frame 70 and the optical film set 80, where the reflection plate 60 is placed between the back plate 20 and the light guide plate 40. The medium plate 70 is placed on the fixing bracket 50. The optical film set 80 is placed on the emitting plane of the light guide plate 40, and part of the optical film set is placed on the medium frame 70. The quantum bar 10 receives the light from the side-type light source 30. The emitting light enters the light guide plate 40 from the incident plane 40a, goes through the reflection plate 60, enters into the optical film set 80 from the emitting plane 40b after reflecting, and finally conducts from the optical film set 80.

Figure 7:
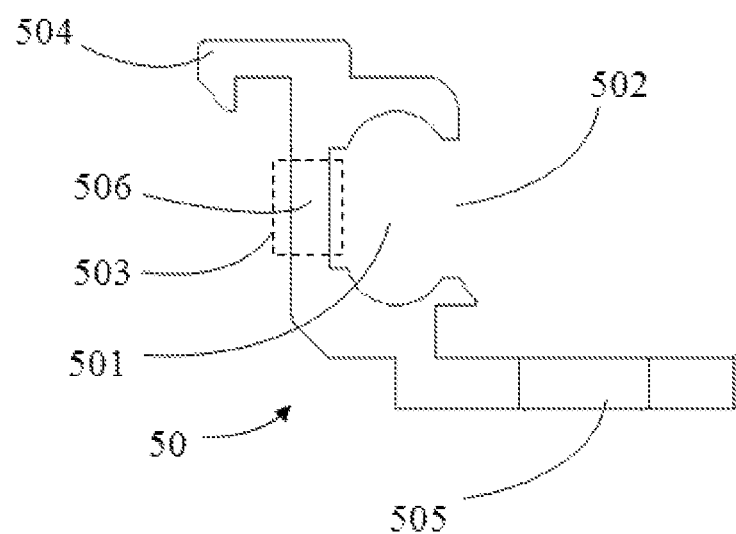
FIG. 7 is the lateral view of the fixing bracket of the embodiment provided by the present invention.
Figure 8:
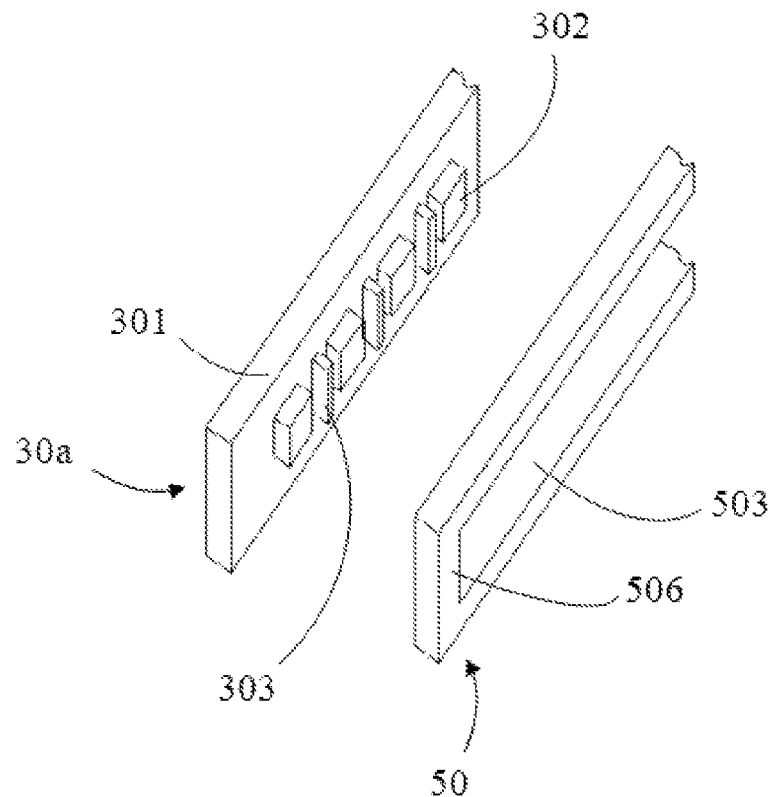
FIG. 8 is the perspective view of the fixing bracket after assembling the light strip provided by the present invention.

The difference with the conventional technology is that, as shown in FIGS. 7 and 8, the fixing bracket 50 and the light strip 30a of the side-type light source 30 are modified in the backlight module, whereby the fixing bracket 50 is roughly a hollow cylinder and the fixing bracket 50 has an accommodating space 501 for placing the quantum bar 10, a the first window 502 faced to the light guide plate 40 and a second window 503 faced to the side-type light source 30. The length of the second window 503 is same as the length of the light strip 30a. As shown in FIG. 8 (FIG. 8 only illustrates that the side wall of the fixing bracket 50 faces toward the side-type light source 30, but omits the other part of the fixing bracket 50), the support beam 303 is disposed between the two neighboring light sources 302 on the light strip 30a. The length of the support beam 303 is less than or equal to the width of the second window 503 (i.e. the support beam 303 can be assembled in the second window 503). The height of the support beam 303 is not less than the height of the light source 302 (The height of the support beam 303 is equal to the height of the light source 302) Whereby, the height of the support beam 303 and the light source 302 indicates the height which the support beam 303 and the light source 302 projects to the print circuit board 301. The length of the support beam 303 is parallel with the short side of the print circuit board 301. The material of the fixing bracket is aluminum alloy and the material of the support beam is metal or plastic In the embodiment, the area of the first window 502 is larger than the area 503 of the second window 503 so that the light reaches the light guide plate 40 easily. Otherwise, the first window 502 is from the first end of the fixing bracket 50 to the second end of the fixing bracket 50. The second window 503 has side frames 506 on the first and second end of the fixing bracket 50.

Figure 9:
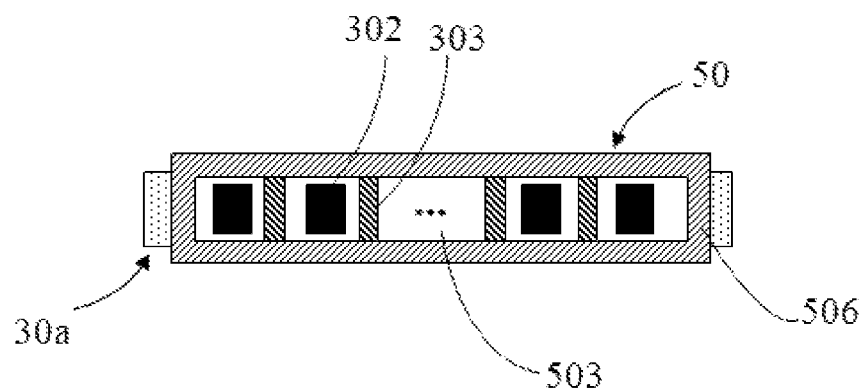
FIG. 9 is a front view of the fixing bracket after assembling the light strip provided by the present invention.

FIG. 9 is the front view of the fixing bracket assembling with the light strip of the present embodiment. As shown in FIG. 9 (FIG. 9 only illustrates that the side wall of the fixing bracket 50 faces toward the side-type light source 30, but omits the other part of the fixing bracket 50), after assembling the fixing bracket 50 with the light strip 30a, the support beam 303 separates the light source 302 from the quantum bar 10, such that the light source 303 does not keep close to the quantum bar 10. Because the second window 503 is a window structure of a long strip, the design of the fixing bracket 50 does not need to be modified when the space of the light source 302 on the light strip 30a is changed. The light strip 30a can match with the second window 503. Moreover, the middle part of the fixing bracket 50 does not have the collapse issue because the support beam 303 is disposed on the light strip 30a. Based on the above mentioned improvement of the structure, in the backlight module of the present embodiment, the versatility of the fixing frame 50 of the quantum bar 10 is better for containing the light strip structure with its different specification, and the cost is reduced. Otherwise, the structure of the fixing bracket 50 of the quantum bar is simple with the advantage of the assembly of the quantum bar 10, and the probability of damage of the quantum bar during the assembly process is reduced.

Figure 6:
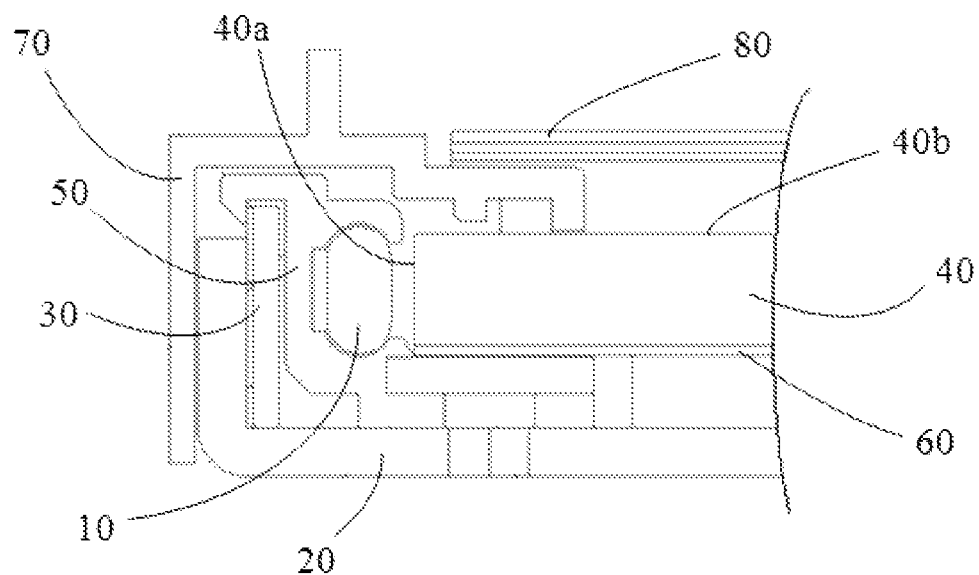
FIG. 6 is the schematic diagram of the backlight module of the embodiment provided by the present invention.

The fixing bracket is shown in FIG. 7. There are a clamping hook structure 504 on the upper portion of the fixing bracket 50 and a thread connection structure 506 on bottom portion of the fixing bracket 50. Refer to FIG. 6. The fixing bracket 50 connects with the back plate 20 via the clamping hook structure 504 and the thread connection structure 506.

It should be noted that, herein, relational terms such as first and second, and the like are only used to distinguish one entity or operation from another entity or action separate, and does not necessarily imply that these entities or the existence of any such relationship or order between actual or operation. Moreover, the terms "comprises," "comprising," or any other variation thereof, are intended to cover a non-exclusive inclusion, such that a series of elements including the process, method, article or device that includes only those elements not expressly listed and further comprising other elements, or further include such process, method, article or device inherent elements. Without more constraints, by the statement "includes one . . . " element defined does not exclude the existence of additional identical elements in the process, including the element, method, article, or apparatus.

Clearly, the scope of the present invention is not limited to the specific embodiments of appeal, the person skilled in the art of the present invention can be various modifications and variations are possible without departing from the spirit and scope of the invention. Thus, if these modifications and variations of the present invention and the claims of the invention are within the scope of technical equivalents, the present invention is also intended to include these changes and modifications included.

What is claimed is:

1. A backlight module comprising:
   a back plate;
   a side-type light source, comprising a light strip, wherein the light strip comprises a printed circuit board and a plurality of light sources assembled on the printed circuit board;
   a light guide plate, disposed on the back plate, wherein the light guide plate has an incident plane and an emitting plane, and the incident plane faces toward the side-type light source;
   a quantum bar, disposed between the light guide plate and the side-type light source via a fixing bracket;
   wherein the fixing bracket is a hollow cylinder, and comprises an accommodating space defined in the fixing bracket for installing the quantum bar, a first window faced toward the light guide plate and a second window faced toward the side-type light source, and a length of the second window is equal to the length of the light strip;
   wherein the side-type light source further comprises at least one support beam disposed on the printed circuit board, each the support beam is disposed between neighboring two of the plurality of light sources and thereby the at least one support beam and the plurality of light source are alternately arranged, and a length of each the support beam is less than or same as a width of the second window, and a height of each the support beam is not less than a height of each the light source, and the light strip is assembled in the second window and whereby the at least one support beam separates the plurality of light sources from the quantum bar installed in the accommodating space;
   wherein the first window is an opening from a first end to a second end of the fixing bracket, the second window is a long-strip continuous opening and has side frames respectively on the first end and the second end of the fixing bracket, the first window and the second window both are communicated with the accommodating space, the area of the first window is larger than the area of the second window.

2. The backlight module as claimed in claim 1, wherein the height of the support beam is equal to the height of the light source.

3. The backlight module as claimed in claim 1, wherein the fixing bracket has a clamping hook structure on upper portion of the fixing bracket and a thread connection structure on bottom portion of the fixing bracket, and the fixing bracket connects with the back plate via the clamping hook structure and the thread connection structure.

4. The backlight module as claimed in claim 1, wherein the material of the support beam is metal or plastic.

5. The backlight module as claimed in claim 1, further comprising:
   a reflection plate, disposed between the back plate and the light guide plate;
   a medium frame, disposed on the fixing bracket;
   an optical film set, disposed on the emitting plane of the light guide plate, and part of the optical film set is placed on the medium frame.

6. The backlight module as claimed in claim 1, wherein material of the fixing bracket is aluminum alloy.

7. The backlight module as claimed in claim 1, wherein the light source is LED.

8. A liquid crystal display device, comprising a liquid crystal display panel and a backlight module, wherein the liquid crystal display panel is disposed in opposite to the backlight module, and the backlight module provides light for the liquid crystal display panel to show images on the liquid crystal display panel, wherein the backlight module comprises:
   a back plate;
   a side-type light source, comprising a light strip, wherein the light strip comprises a printed circuit board and a plurality of light sources assembled on the printed circuit board;
   a light guide plate, disposed on the back light, wherein the light guide plate has a incident plane and an emitting plane, and the incident plane faces toward the side-type light source;
   a quantum bar, disposed between the light guide plate and the side-type light source via a fixing bracket;
   wherein the fixing bracket is a hollow cylinder, and comprises an accommodating space defined in the fixing bracket for installing the quantum bar, a first window faced toward the light guide plate and a second window faced toward the side-type light source, and a length of the second window is equal to the length of the light strip;
   wherein the side-type light source further comprises at least one support beam disposed on the printed circuit board, each the support beam is disposed between neighboring two of the plurality of light sources and thereby the at least one support beam and the plurality of light source are alternately arranged, and a length of each the support beam is less than or same as a width of the second window, and a height of each the support beam is not less than a height of each the light source, and the light strip is assembled in the second window and whereby the at least one support beam separates the plurality of light sources from the quantum bar installed in the accommodating space;

wherein the first window is an opening from a first end to a second end of the fixing bracket, the second window is a long-strip continuous opening and has side frames respectively on the first end and the second end of the fixing bracket, the first window and the second window both are communicated with the accommodating space, the area of the first window is larger than the area of the second window.

9. The liquid crystal display device as claimed in claim 8, wherein the height of the support beam is equal to the height of the light source.

10. The liquid crystal display device as claimed in claim 8, wherein the fixing bracket has a clamping hook structure on upper portion of the fixing bracket and a thread connection structure on bottom portion of the fixing bracket, and the fixing bracket connects with the back plate via the clamping hook structure and the thread connection structure.

11. The liquid crystal display device as claimed in claim 8, wherein the material of the support beam is metal or plastic.

12. The liquid crystal display device as claimed in claim 8, further comprising:
 a reflection plate, disposed between the back plate and the light guide plate;
 a medium frame, disposed on the fixing bracket;
 an optical film set, disposed on the emitting plane of the light guide plate, and part of the optical film set is placed on the medium frame.

13. The liquid crystal display device as claimed in claim 8, wherein material of the fixing bracket is aluminum alloy.

14. The liquid crystal display device as claimed in claim 8, wherein the light source is LED.

\* \* \* \* \*